United States Patent
Zabala et al.

(10) Patent No.: US 6,505,526 B2
(45) Date of Patent: *Jan. 14, 2003

(54) FLUID FLOW INSPECTION APPARATUS AND METHOD FOR GAS TURBINE BUCKETS

(75) Inventors: Robert John Zabala, Schenectady, NY (US); Bruce Alan Knudsen, Amsterdam, NY (US)

(73) Assignee: General Electric Company, Schenectady, NY (US)

( * ) Notice: Subject to any disclaimer, the term of this patent is extended or adjusted under 35 U.S.C. 154(b) by 49 days.

This patent is subject to a terminal disclaimer.

(21) Appl. No.: 09/735,632

(22) Filed: Dec. 14, 2000

(65) Prior Publication Data

US 2002/0076326 A1 Jun. 20, 2002

(51) Int. Cl.⁷ ............................................... G01N 19/00
(52) U.S. Cl. ........................... 73/865.9; 415/118; 73/37
(58) Field of Search ........................... 416/61; 415/118, 415/116, 117; 134/101.1, 101.2, 113, 865.9, 22.1, 22.18, 18; 137/240, 345

(56) References Cited

U.S. PATENT DOCUMENTS

| | | | |
|---|---|---|---|
| 3,156,584 A | * 11/1964 | Yurdin | |
| 3,478,580 A | 11/1969 | Siemietkowski et al. | |
| 3,698,238 A | * 10/1972 | Wall et al. | ...................... 73/53 |
| 3,851,342 A | * 12/1974 | Moore | ........................... 4/256 |
| 4,063,317 A | * 12/1977 | Santore | ........................ 4/255 |
| 4,675,728 A | 6/1987 | Egger et al. | |
| 4,682,491 A | 7/1987 | Pickard | |
| 4,919,154 A | * 4/1990 | Engle | ....................... 134/22.12 |
| 5,007,444 A | * 4/1991 | Sundholm | .................... 134/102 |
| 5,322,571 A | * 6/1994 | Plummer et al. | ........ 134/22.12 |
| 5,366,562 A | * 11/1994 | Schwarze et al. | ......... 134/22.12 |
| 5,686,989 A | 11/1997 | Hoffman et al. | |
| 5,699,817 A | * 12/1997 | Bankert et al. | .......... 134/102.2 |
| 6,002,995 A | 12/1999 | Suzuki et al. | |
| 6,004,620 A | * 12/1999 | Camm | ........................ 427/142 |

FOREIGN PATENT DOCUMENTS

JP            01320445 A      12/1989

* cited by examiner

*Primary Examiner*—Edward K. Look
*Assistant Examiner*—James M McAleenan
(74) *Attorney, Agent, or Firm*—Banner & Witcoff, Ltd.

(57) ABSTRACT

An inspection apparatus for water flow testing of cooling passageways in gas turbine buckets provides observable visual determination of whether any blockages were formed during the manufacturing or refurbishing processes. The inspection apparatus includes a manifold block and manifold control valve mounted on a platform and adapted to engage the root end of a turbine bucket and supply fluid therethrough. The turbine bucket is affixed to the platform with a holder. The fluid exiting at the tip of the turbine bucket is visible and any blockages in the passageways will be easily discerned by the absence or paucity of fluid flow at the tip. Fluid is supplied to the manifold block by a pressure regulated fluid supply line with a control valve and a flow meter. An air supply line is also connected to the manifold block to supply air through the passageways to remove residual fluid from the bucket.

24 Claims, 3 Drawing Sheets

FLUID FLOW INSPECTION APPARATUS AND METHOD FOR GAS TURBINE BUCKETS

BACKGROUND OF THE INVENTION

In order to improve the performance of gas turbines, higher operating temperatures are required. These higher temperatures require supplemental cooling of the bucket via radial and serpentine cooling passageways in the buckets. Air cooled gas turbine buckets are typically cooled by bringing compressor discharge air into the wheel and channeling the air into dovetail slots between the wheel and turbine buckets through the entrance apertures of the cooling passageways.

For optimal turbine performance, it is important for these passageways to be free and clear of any blockage in order to meet minimum air flow requirements. When turbine buckets are manufactured or used buckets refurbished, the processing steps can include any number of methods such as grit blasting, shot blasting and aqua polishing which make is possible to introduce foreign matter into the cooling passageways. If there is a sufficient quantity of foreign matter, the passageways can become blocked which reduces the performance of the machine. To determine whether there is a blockage, the conventional inspection process is to subject the bucket to an air flow test in which air is supplied through the passageway from an inlet to an outlet. In most cases multiple passageways of a bucket are tested simultaneously. The air flow test has proven to be unreliable especially in multiple hole flow tests as it is possible to pass the air flow test with blocked passageways.

In order to ensure that buckets with blocked passageways are not inadvertently shipped, additional measures are sometimes required such as pulling string or cord through the passageways to demonstrate that the passageways are clear. Inserting the string into the cooling passageways adds to the cost of the buckets.

A more reliable and efficient way of inspecting the cooling passages for blockages is needed as well as a process for documenting such an inspection.

BRIEF SUMMARY OF THE INVENTION

To address the reliability issues of the conventional air flow test, the present invention employs a fluid, such as a liquid, for example water, flow inspection apparatus and process for gas turbine buckets. With water flow inspection, the flow of water through each of the cooling passageways is visible, and can be documented by recording the exit of water from the bucket on a video medium. The water flow inspection process employs a water flow inspection apparatus which includes a bench or platform having a manifold block affixed to the bench. The manifold is supplied by a pressure regulated water supply line controlled by a valve and equipped with a flow meter. The water flow inspection apparatus also includes a pressure regulated air supply line in communication with the manifold for clearing the cooling passages of any residual water from the water flow test.

To conduct a water flow inspection, a turbine bucket is affixed to the bench with its root or base in communication with and sealed to the manifold block. The tip of the bucket extends toward an area where water can be sprayed. The water supply line valve is opened to allow water to flow through the cooling passages of the bucket. At the tip, the water exiting each cooling passage of the bucket is clearly visible. If any passage is blocked, it would be readily visible by the water flow test. Overall water flow through the cooling passages can be read from the flow meter, and this reading compared against a calculated overall minimum flow.

The inspection apparatus includes vertical supports mounted to the bench and linked together by a horizontal support. The components of the inspection apparatus are mounted to the supports or the bench.

The inspection apparatus can also include components to provide documentation of the test for supplier and customer records. A number of compact video cameras are mounted to the apparatus and aimed at critical observation areas. One camera is aimed at the serial number area of the turbine bucket affixed in its holder, a second camera is aimed in the tip area to observe water flow out of the tip, and a third camera is aimed at the flow meter. These video cameras are coupled to a video recorder so that the inspection can be documented by way of a video recording. Since the recording will include the serial number of the particular bucket being tested, the recording can be archived for record keeping purposes.

The video recording of the water flow inspection can also be displayed for a customer on a web site on the Internet in real time or time delay. Alternatively the video recording can be sent to a customer as a data file for downloading and review. The customer is then able to view the water flow inspection and provide approval or disapproval immediately via the internet or other communication media.

DETAILED DESCRIPTION OF THE INVENTION

Figure 1:
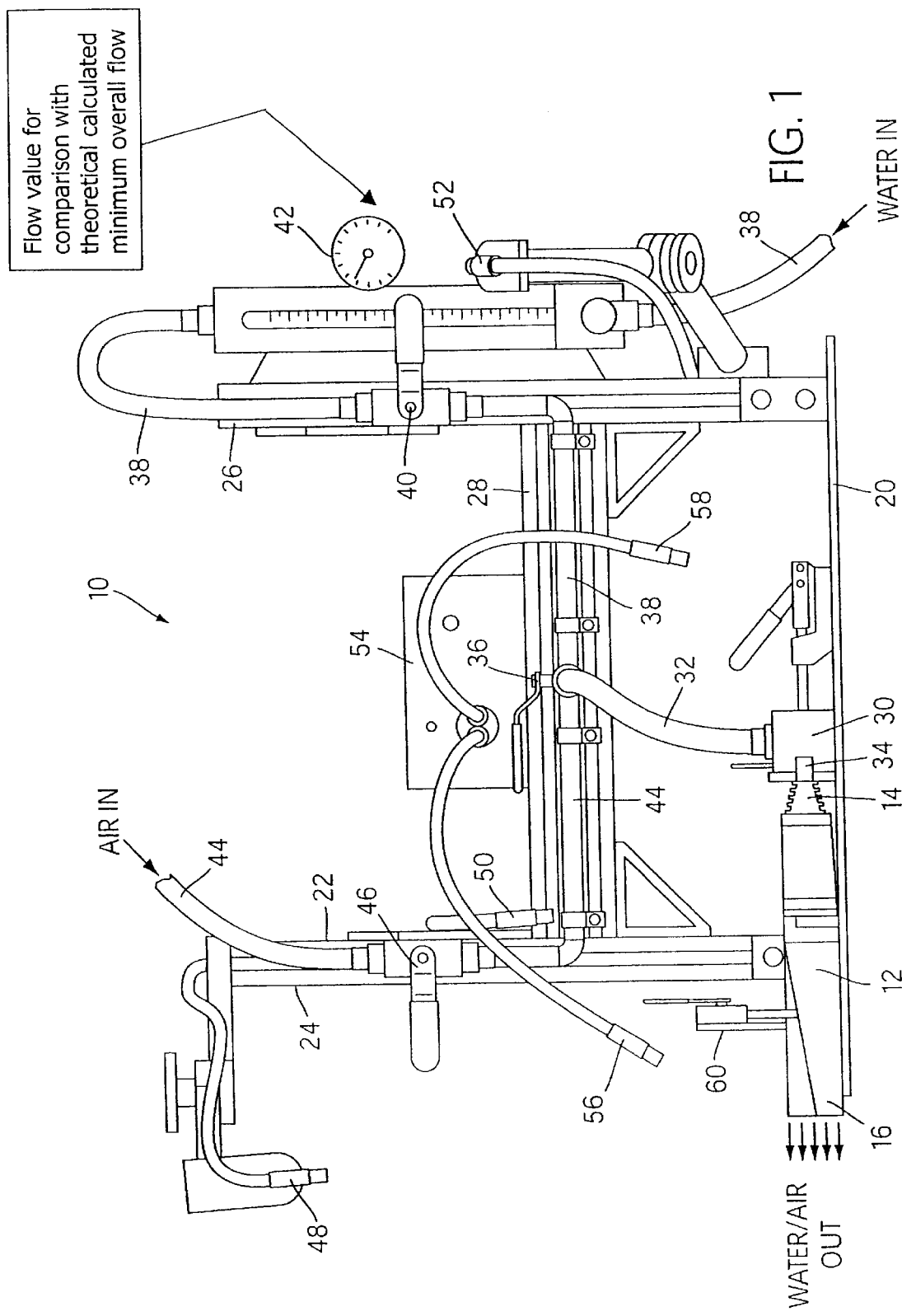
FIG. 1 is an elevational view of the overall inspection apparatus.

The components of a fluid flow inspection apparatus 10 are shown in FIG. 1 in elevation. A turbine bucket 12 having a dovetail or root end 14, a tip 16 and a plurality of cooling passageways 18 of any desired configuration, is shown with the inspection apparatus for illustration purposes. Inspection apparatus 10 includes a platform or bench 20 on which is mounted a support framework 22. Support framework 22 can include any number of supports in any orientation, and in the illustrated embodiment, includes a pair of vertical supports 24, 26 linked together by a horizontal support 28 which is generally parallel to bench 20. The invention is described herein with the fluid described as a liquid such as water. This description is merely exemplary and is not intended to limit the invention. Any fluid which is visible or ma de visible may be used.

Affixed to the planar surface of bench 20 is a manifold block 30 having an inlet 32, an outlet 34 and a manifold control valve 36. Manifold block 30 is disposed so that its outlet 34 can mate with and engage the dovetail or root end 14 of a turbine bucket 12 with the bucket in parallel relation to the bench. The outlet of the manifold block 30 is designed to seal against the dovetail end 14 of the bucket and supply fluid to some or all of the cooling passageways 18 of the bucket simultaneously. The manifold block is located on the bench so that when bucket 12 is clamped in place, its tip 16 extends over a free edge of the bench. At manifold control valve 36, inlet 32 of manifold block 30 is coupled to a pressure regulated water supply line 38 having a water control valve 40. A pressure regulator is connected to the water supply line upstream. A back flow prevention mechanism (not illustrated) can also be installed on the water supply line as well. At least a portion of water supply line 38 and a flow meter 42 are attached to support framework 22 for ready visual observation and ease of use.

Also at manifold control valve 36, a pressure regulated air supply line 44 is connected to inlet 32 of the manifold block. Air supply line 44 has an air control valve 46 and a pressure regulator associated with it. Air is supplied to the manifold to clear out residual water in the bucket passageways after a flow test is performed. At least a portion of air supply line 44 and its components are attached to support framework 22. In the illustrated embodiment, the water supply line and flow meter are attached to vertical support 26 of the support framework, while the air supply line is attached to vertical support 24.

If the inspection is to be documented by video recording, the inspection apparatus is provided with at least one and possibly a number of compact video cameras mounted on flexible, bendable conduits are aimed at critical areas of the test. For example, video camera 48 is aimed toward the tip 16 of the bucket to record the flow of water out of the passageways. Video camera 50 is aimed toward the serial number marking on the test bucket 12. A third video camera 52 is aimed at water flow meter 42. These video cameras are connected to recording devices and record their respective areas of the inspection apparatus during a test and the resulting recordings stored on suitable medium for archival purposes or for transmission and review by customers. To facilitate the video recordings, at least one and possibly a number of light sources can also be aimed at the critical areas to better illuminate them for videography. One preferred type of light source 54 is shown in FIG. 1 with a number of flexible, bendable cables having lights 56 and 58 mounted at their ends.

Figure 2:
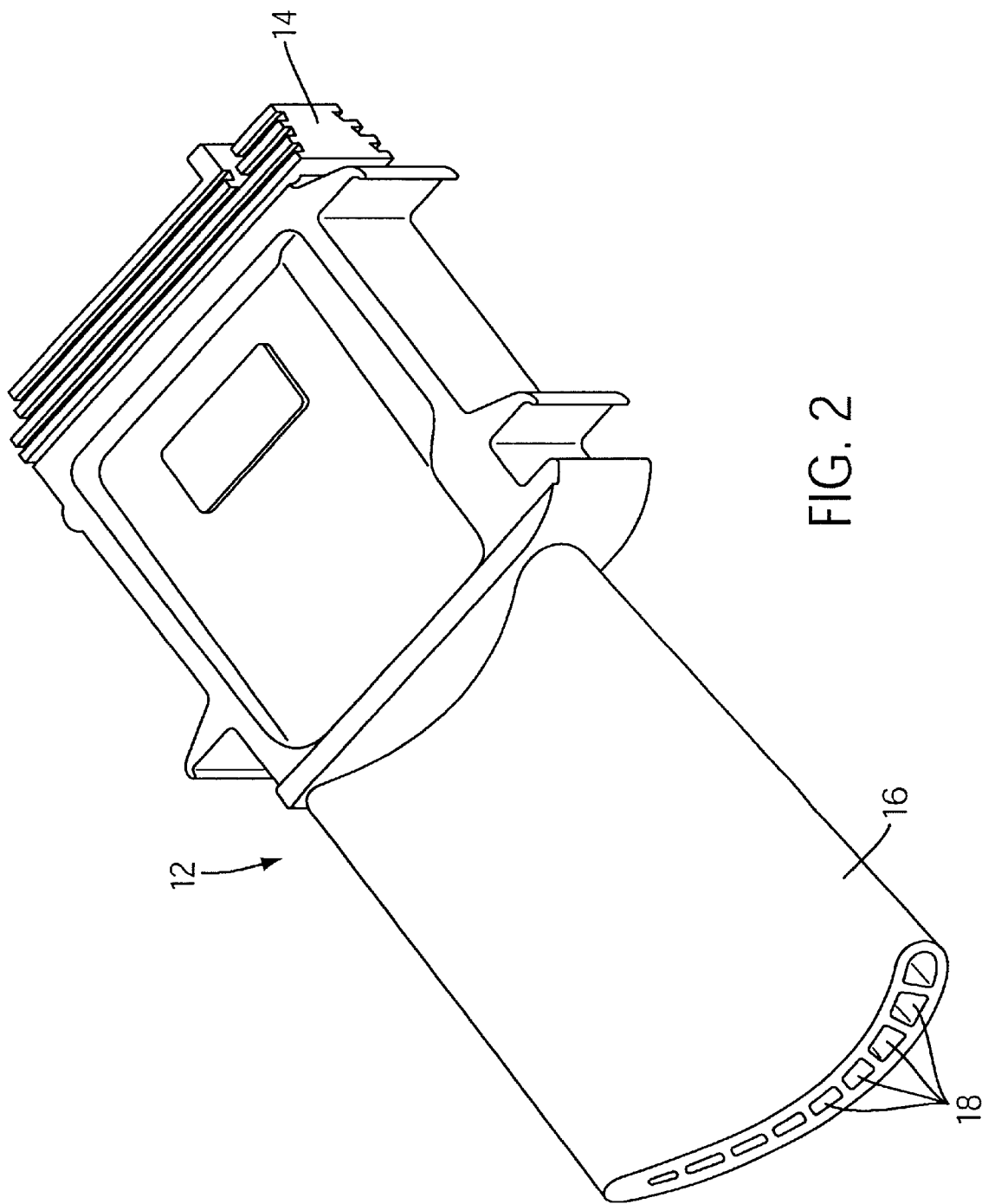
FIG. 2 is a perspective view of a turbine bucket to be inspected.

Before conducting a flow test, the air control valve and the water control valve are closed. Then manifold control valve 36 is confirmed to be closed, and a turbine bucket 12, FIG. 2, to be tested is installed on bench 20 with a clamp 60, a holder or other suitable hardware, with its dovetail end 14 in communication with outlet 34 of manifold block 30. The dovetail end 14 of bucket 12 is sealed against the manifold outlet and the body of the bucket in generally parallel relation to the bench.

Figure 3:
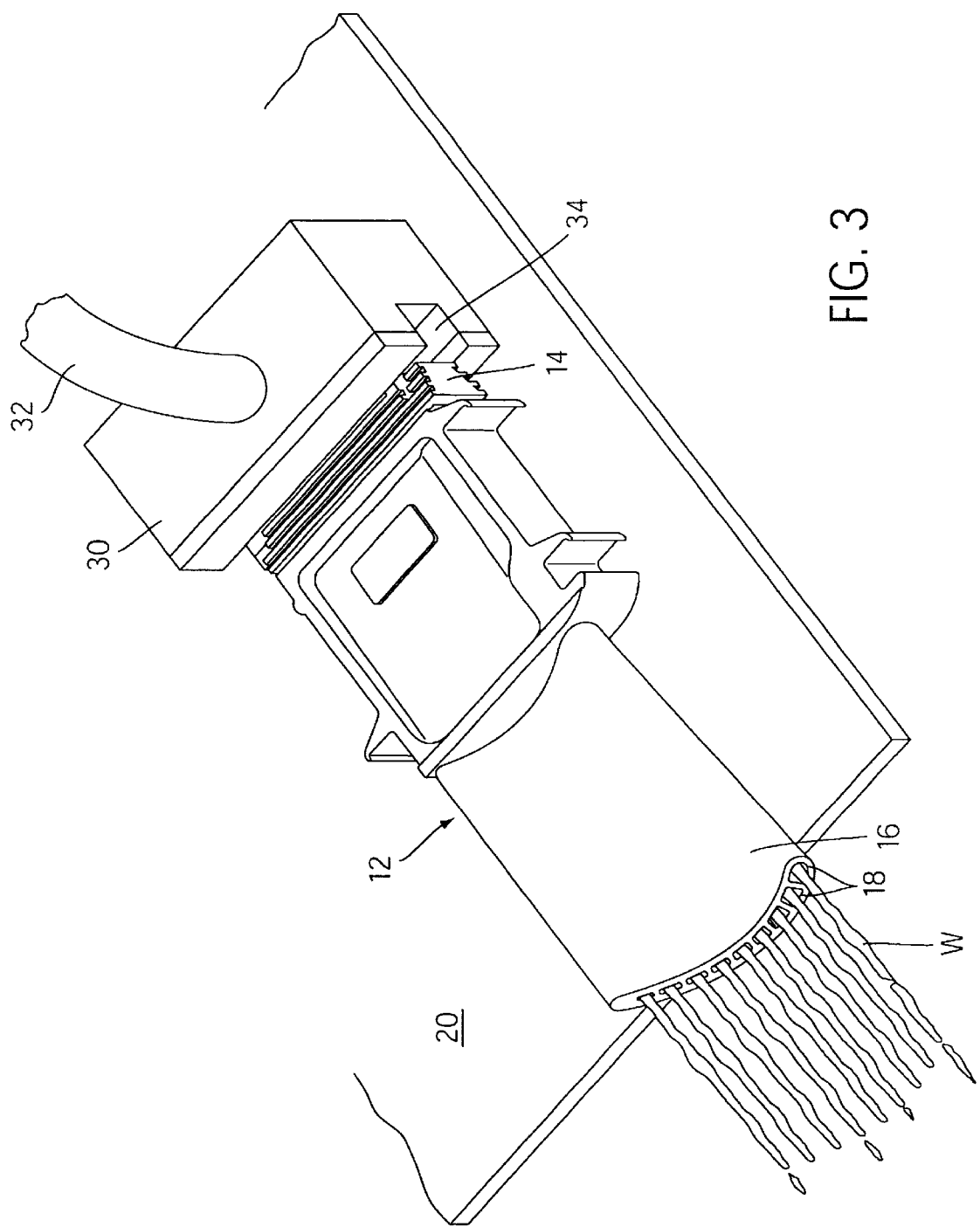
FIG. 3 is a perspective view of a turbine bucket with water flowing out of the tip while being tested.

To conduct the test, once the bucket 12 is in place with its tip 16 extending over the edge of the bench, the water control valve 40 is opened to a predetermined pressure. The manifold control valve 36 is then opened to allow water to flow through the manifold and the cooling passageways 18 of the bucket. Water W should exit the passageways 18 at the tip 16 of the bucket 12, FIG. 3. Any blockage, either partial or total blockage, of any of the passageways due to foreign matter occlusion should be readily observable by the presence or absence of water flow through the passageways.

The results of the flow test on each turbine bucket should be recorded and documented with the serial number of the bucket before the water control valve is closed. Once the flow test is complete, water control valve 40 is closed and air control valve 46 is opened to supply air through the passageways to blow out excess water. The air control valve is then closed, and manifold control valve 36 is also closed. The bucket is then removed from the bench.

Besides visual observation of the water flow through the passageways, the inspection apparatus provides a redundant check on the overall water flow by reading at least one flow meter 42 while the water is coursing through the passageways. The reading can be compared against a theoretical calculated value for overall minimum flow. The calculated value can readily be calculated for specific buckets, and is based on the perimeter of the cooling passageway and its length, the number of passageways and pressure. For example, in a 6B-Stage 1 turbine bucket 12 illustrated in the drawings, the calculated minimum flow would be 2.83 gal/min at 20 psi pressure. If the flow meter reading is less than the calculated minimum overall flow, closer inspection of the bucket is warranted to determine if blockages exist.

The inspection apparatus described herein can be easily adapted for a variety of bucket sizes, and necessary pressures on the water supply line where flow testing is required. The inspection apparatus can be used with any article with internal passages which need to be tested for blockages. Alternative manifold blocks may be designed to fit various buckets or other articles with variously shaped and sized passageways. Such variations are contemplated to be within the scope of this invention. Although the illustrated embodiment is described with water as the testing medium, any suitable fluid, such as a colored gas or vapor, which provides visual confirmation of flow through the bucket can be used. It may be desirable to add a dye or other additive to the fluid. It may also be desirable to conduct the test under special lighting conditions such as colored lights, black lights or strobe to make the flow test even easier to observe and record.

Thus has been described an inspection apparatus for water flow testing the cooling passageways of gas turbine buckets for blockages. The foregoing explanation includes many variations and embodiments, and the invention is not intended to be limited to the specific details disclosed herein, but only by the claim appended hereto.

What is claimed is:

1. A fluid flow inspection apparatus adapted for fluid flow testing of internal passages in articles for blockages, said apparatus comprising:
   a platform;
   a manifold block having an outlet, a manifold control valve and a fluid inlet affixed to said platform;
   a supply of a visible fluid; and
   a fluid supply line coupled to said fluid inlet of said manifold block for supplying fluid under pressure from said supply of visible fluid, wherein
      the manifold outlet is configured for placement into and removal from temporary sealed fluid communication with at least one end of a turbine bucket, and
      flow of visible fluid from the turbine bucket is observable when the turbine bucket is in sealed fluid communication with the manifold outlet and has unblocked internal passages.

2. The fluid flow inspection apparatus of claim 1, further comprising a fluid control valve on said fluid supply line for controlling flow of fluid through said fluid supply line.

3. The fluid flow inspection apparatus of claim 2, further comprising a flow meter associated with said fluid supply line that measures flow therethrough.

4. The fluid flow inspection apparatus of claim 1, further comprising a holder attached to said platform for affixing a turbine bucket to said platform for testing.

5. The fluid flow inspection apparatus of claim 4, wherein said holder is a clamp.

6. The fluid flow inspection apparatus of claim 1, further comprising an air supply line in communication with said manifold block for supplying air to said passages.

7. The fluid flow inspection apparatus of claim 6, further comprising an air control valve associated with said air supply line.

8. The fluid flow inspection apparatus of claim 1, further comprising a support framework attached to said platform for supporting said fluid supply line.

9. The fluid flow inspection apparatus of claim 1, wherein the visible fluid is a liquid.

10. The fluid flow inspection apparatus of claim 9, wherein the liquid is water.

11. A fluid flow inspection apparatus for fluid flow testing of internal passageways in articles for blockages, said apparatus comprising:
   a platform;
   a workpiece holder attached to said platform configured for retaining a turbine bucket to be tested;
   a manifold block attached to said platform and disposed proximate said workpiece holder, said manifold block including an outlet adapted to sealingly engage a root end of a turbine bucket, a manifold control valve and a manifold inlet;
   a supply of a visible fluid; and
   a pressure regulated fluid supply line equipped with a fluid control valve coupled to said manifold inlet for supplying visible fluid from said supply through said manifold block and through the passageways of the turbine bucket.

12. The inspection apparatus of claim 11, further comprising a fluid flow meter associated with said fluid supply line that measures flow therethrough.

13. The inspection apparatus of claim 12, further comprising an air supply line with an air control valve coupled to said manifold inlet for supplying air to said manifold block for clearing residual fluid from said block and the passageways of the turbine bucket.

14. The inspection apparatus of claim 13, further comprising a support framework attached to said platform for supporting a portion of said fluid supply line.

15. The inspection apparatus of claim 14, wherein said flow meter is supported on said support framework.

16. The fluid flow inspection apparatus of claim 11, wherein the visible fluid is a liquid.

17. The fluid flow inspection apparatus of claim 16, wherein the liquid is water.

18. A fluid flow inspection apparatus for fluid flow testing of passageways in gas turbine buckets for blockages, said apparatus comprising:
   a platform;
   a workpiece holder attached to said platform configured for retaining a turbine bucket to be tested;
   a manifold block attached to said platform and disposed proximate said workpiece holder, said manifold block including an outlet adapted to sealingly engage a root end of a turbine bucket, a manifold control valve and a manifold inlet;
   a support framework attached to said platform;
   a supply of a visible fluid;
   a pressure regulated fluid supply line supported on said support framework, said fluid supply line equipped with a fluid control valve and flow meter coupled to said manifold inlet for supplying visible fluid from said supply through said manifold block and through the passageways of the turbine bucket; and
   an air supply line supported on said support framework, said air supply line equipped with an air control valve coupled to said manifold inlet for supplying air to said manifold block for clearing residual fluid from said block and the passageways.

19. A method of fluid flow testing passageways in a turbine bucket for blockages, the method comprising steps of:
   affixing a turbine bucket to a testing apparatus;
   sealing a root end of the bucket such that passageways are in communication with a fluid supply line;
   providing visible fluid flow through the passageways; and
   inspecting the passageways at the tip of the bucket to determine whether fluid flow is impeded by blockages.

20. The method of fluid flow testing of claim 19, further comprising the steps of measuring overall flow through the passageways and comparing measured overall flow with a theoretical calculated minimum overall flow for the turbine bucket.

21. A method of testing a turbine bucket to determine whether passageways formed in the bucket are blocked, the method comprising:
   sealing the bucket to a fluid supply; and
   supplying visible fluid under pressure through a root end of the bucket to force fluid through the passageways to detect blockages.

22. The method of testing of claim 21, further comprising the step of affixing the bucket to a platform such that its tip end extends over an edge of the platform.

23. The method of testing of claim 22, wherein said sealing step includes connecting the root end of the bucket to a manifold block.

24. The method of testing of claim 21, further comprising the step of providing air through the bucket to remove residual fluid from the passageways.

* * * * *